March 19, 1963
M. BRAVERMAN
3,082,357
ADJUSTABLE PULSE GENERATOR
Filed Aug. 19, 1960
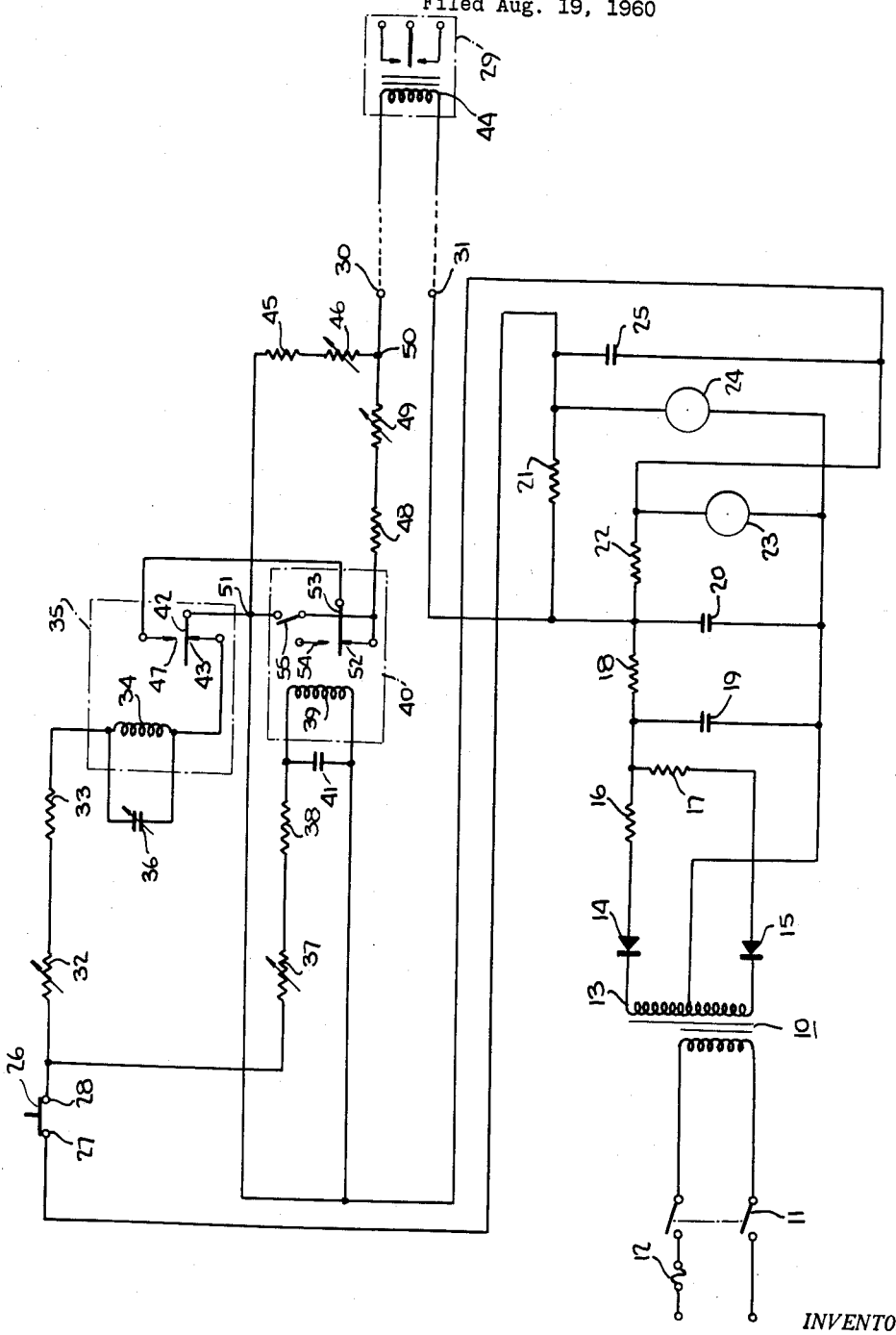
INVENTOR.
MURRAY BRAVERMAN
BY
Kenyon & Kenyon
ATTORNEYS

United States Patent Office 3,082,357
Patented Mar. 19, 1963

3,082,357
ADJUSTABLE PULSE GENERATOR
Murray Braverman, New York, N.Y., assignor to Bulova Research and Development Laboratories, Inc., Long Island, N.Y., a corporation of New York
Filed Aug. 19, 1960, Ser. No. 50,671
6 Claims. (Cl. 317—141)

This invention relates to a device which provides a series of electrical current pulses. In a preferred form of this invention, the number of pulses per series and the duty cycle thereof may be varied within wide limits. The invention is particularly suitable for use in testing relays actuated by a solenoid.

In the conventional type of relay which employs a solenoid to actuate a moving armature, a minimum level of current must be passed through the solenoid before there is a sufficiently strong magnetic field to attract the armature into its closed position. Such a type of relay has a maximum current level above which the wires comprising the solenoid coil are subject to overheating and possible rupture. Accordingly, there is a need for a device which can be used to test such types of relays, both at the high and low current levels, to assure that the relay when placed in service will neither fail nor operate prematurely.

It is therefore an object of this invention to provide device which can alternately produce a current at a high level and a current at a low level.

To provide a test which can be relied upon, it is necessary that the relay be subjected to a plurality of pulses which alternately open and close the relay. The pulse which closes the relay may be chosen to have a current level which is of the order of the value of maximum current which is to be handled by the relay in actual service. The minimum current to be provided by the series of pulses is chosen to be approximately equal to the value of minimum current necessary to produce movement of the relay armature.

It is therefore a further object of this invention to provide a device which produces a series of pulses, the number of pulses per series being sufficient to assure reliability of the relay being tested.

Briefly stated, the present invention involves the use of two independent timing means in conjunction with two resistance circuits which are connected in such manner that they may be employed independently or in parallel. A power supply is provided which produces a controlled voltage source.

The two timing means act as on-off switches, the time cycle of the first being such that it is actuated several times for each actuation of the second timing means. The on-off action of the first timing means serves to alternately connect and disconnect the two resistance circuits in parallel. The second timing means serves to isolate the first timing means thereby terminating the alternation of the current pulses. The two resistance circuits are connected in series with the solenoid of the relay to be tested and this series circuit is connected across the controlled voltage source. Accordingly, by adjusting the values of the resistances in the aforementioned resistance circuits, the relay being tested is subjected to alternate pulses of the minimum and maximum currents necessary to test the reliability of the relay.

The number of pulses per test is determined by the combined action of the two timing devices. Thus, the number of times the first timing means is actuated for each actuation of the second timing means determines the number of pulses to which the relay being tested is subjected.

The invention will be more readily understood in conjunction with the drawing which depicts the circuit diagram of a preferred embodiment of the present invention.

The power supply for the device shown in the drawing involves the use of a conventional transformer 10, double-pole single-throw switch 11 and fuse 12. The secondary 13 of transformer 10 is connected to diodes 14 and 15 to provide full wave rectification. Resistors 16, 17 and 18 and capacitors 19 and 20 make up the balance of the conventional power supply, the output of the power supply being provided across the terminals of the capacitor 20.

Resistors 21 and 22 connected to voltage regulator tubes 23 and 24, and capacitor 25 are connected as shown to produce two different controlled voltage levels, one at the junction of resistor 22 and tube 23 and the other at the junction of resistor 21 and tube 24. The difference between the two voltage levels appears across capacitor 25.

One side of capacitor 25 is connected to one terminal 27 of manually operated switch 26. When switch 26 is closed, terminal 27 is connected to terminal 28.

The relay 29 to be tested, shown in the drawing within the dotted lines, is connected across terminals 30 and 31. Assuming for the purposes of this description that the circuit has been adjusted to provide the desired minimum and maximum current values, the details of which operation will be described below, testing of relay 29 is initiated by the closing of switch 26.

Prior to closing switch 26, one side of resistor 22 is connected to one side of solenoid 44 of relay 29 being tested, and the other side of resistor 22 is connected to resistor 45, which in turn is connected in series with adjustable resistor 46 and the other side of solenoid 44. In such a situation, as will be described in detail below, the current flowing through solenoid 44 of relay 29 is equal to the minimum value.

Closing of switch 26 subjects two independent timing circuits to the voltage, appearing across capacitor 25. The first of these timing circuits is composed of series connected adjustable resistor 32, resistor 33 and the parallel circuit comprising solenoid 34 of relay 35 and adjustable capacitor 36. The second timing circuit is composed of series connected adjustable resistor 37, resistor 38, and the parallel circuit of the solenoid 39 of relay 40 and capacitor 41.

With respect to the first timing circuit, closing of switch 26 causes current to begin to flow through resistors 32 and 33 and also through the parallel circuit comprising solenoid 34 and capacitor 36.

As the current through the circuit starts to increase rapidly, solenoid 34 appears as a very high impedance and therefore the balance of the current flows through capacitor 36. As the capacitor 36 continues to charge, the current flow through it decreases and the current flow through solenoid 34 increases. After a predetermined period of time, the current flow through solenoid 34 is sufficient to actuate armature 42. The actuation causes armature 42 to move into contact with point 47 and out of contact with point 43.

The actuation of relay 35 places series connected resistor 48 and adjustable resistor 49 in parallel with the series circuit of resistors 45 and 46. Thus, starting from junction 50 of resistors 46 and 49, one path is through resistors 46 and 45 to terminal 51. The other path of the parallel circuit starts from junction 50 and is through resistors 49 and 48, through point 52 of relay 40, thence through armature 53 of relay 40 to point 47 of relay 35, and finally through armature 42 to point 51. In this condition, the current flowing through solenoid 44 of relay 29 is at the maximum level due to the reduction of resistance in the circuit caused by addition of the parallel circuit of resistors 48 and 49.

The actuation of relay 35, which resulted in armature 42 breaking contact with point 43, isolates coil 34 and timing capacitor 36. Accordingly, current flows from one plate of the timing capacitor 36 through solenoid 34 to the other plate of the capacitor. Due to the resistive losses in this circuit, the current flowing through solenoid 34 gradually diminishes until the current flowing therethrough is no longer sufficient to maintain armature 42 in its actuated position. When this occurs, armature 42 returns to its unactuated position in contact with point 43 and the cycle is commenced once more. In this manner solenoid 44 of relay 29 is subjected to alternating pulses of high and low current levels.

The second timing circuit which involves relay 40, is undergoing a slower change than the first timing circuit. That is to say, resistors 37 and 38 are chosen to delay actuation of relay 40 for a period of time sufficient to permit relay 35 to go through several cycles. When the current through solenoid 39 of relay 40 attains the necessary value, armature 53 is actuated and moves out of contact with point 52 and into contact with point 54. This movement of armature 53 disconnects the circuit containing resistors 48 and 49 from the circuit composed of resistors 45 and 46. Accordingly, irrespective of the position of armature 43 of relay 35, resistors 48 and 49 are no longer connected in parallel with resistors 45 and 46. This causes the current flowing through solenoid 44 of relay 29 being tested to decrease to the minimum value. Since the movement of armature 53 of relay 40 has no effect on the current flowing through solenoid 39, relay 40 remains actuated so long as switch 26 is held in the closed position.

Thus, the net result of the device as described above is that the relay to be tested is subjected to a series of current pulses which vary between a lower level, chosen with respect to the minimum current necessary to actuate the relay, and an upper level, chosen with respect to the maximum current which the relay is expected to encounter in service. The number of variations in the current passing through the solenoid of the relay being tested is controlled by proper adjustment of circuit variables. Likewise, the relative duration of the high level current with respect to the low level current, i.e. the duty cycle, may also be chosen by appropriate selection of circuit variables. The method of obtaining the aforementioned variations will be discussed below in detail.

With respect to the first timing circuit which encompasses relay 35, the time necessary for the current through solenoid 34 to attain the level required before actuation of armature 42 is governed primarily by the combined size of the resistors 32 and 33. As the resistance of resistors 32 and 33 is increased, the time necessary for armature 42 to be actuated increases. The size of timing capacitor 36 also has an effect upon this time, but its influence is subordinate to that of resistors 32 and 33. The embodiment shown in the drawing indicates that only one of the two resistors is variable. This, of course, is a matter of choice and both resistors may be made variable, or in the alternative, a single variable resistor may be employed.

The time during which the high current level is passing through the solenoid in the relay tested is governed solely by the size of timing capacitor 36. A large timing capacitor will have a large charge, and accordingly, the time required for the current flowing in the circuit made up of timing capacitor 36 and solenoid 34 to decrease to a value which permits armature 42 to return to its unactuated position will therefore be relatively high. Decreasing the size of the timing capacitor will, of course, decrease this period of time. Thus, adjustment of variable resistor 32 affects the time during which the minimum current flows through solenoid 44, and variation of timing capacitor 36 affects the period of time during which the maximum current flows through the solenoid.

The combined size of resistors 37 and 38 determines the length of time necessary for the current passing through solenoid 39 in relay 40 to attain the level necessary to actuate armature 53 thereby ending the cyclical fluctuation of current through the solenoid of the relay being tested. As in the case of the first timing circuit described above, various combinations of variable resistors may be used in place of resistors 37 and 38 to achieve the desired result. Relay 40 is deactuated only by release of switch 26.

In order to pre-set the circuit shown in the drawing for the desired minimum and maximum currents, an ammeter, not shown, is inserted in series with solenoid 44 of the relay to be tested. Switch 11 is closed. In this condition resistors 45 and 46 and the solenoid 44 of the relay being tested are placed in parallel with resistor 22. This is the condition during which the minimum current flows through solenoid 44. The exact current desired is obtained by adjustment of variable resistor 46. Although the embodiment shown in the drawing depicts a fixed resistor 45 in series with variable resistor 46, it is clear that a single variable resistor may be substituted for the two resistors.

In order to adjust the current flowing through relay 44 to the required maximum value, switch 55 is closed. In this condition, resistors 48 and 49 are connected in parallel with resistors 45 and 46. By adjustment of variable resistor 49, the exact value of maximum current is obtained. Again, it is clear that a single variable resistor may be substituted for resistors 48 and 49.

After the minimum and maximum current adjustments have been made, switch 55 is opened, the ammeter removed from the circuit if desired, and test commenced by closing of switch 26. Once switch 26 is closed, a series of pulses of appropriate magnitude and duration will be passed through the solenoid of the relay being tested. Only one series of such pulses will pass through the solenoid being tested regardless of the length of time switch 26 is maintained in a closed position. In order to subject the solenoid of the relay being tested to a second series of pulses, switch 26 must be opened for a time sufficient to permit relay 40 to return to its unactuated condition. This occurs by capacitor 41 discharging through solenoid 39. After such time, switch 26 may again be closed, thereby subjecting the relay to a second series of pulses.

It is to be understood that the illustrative example described above in conjunction with the drawing is intended merely as exemplary of the present invention and changes may be made by one skilled in the art without departing from the spirit and scope of the invention.

I claim:

1. A device for producing a series of electrical current pulses which alternate between an upper current level and a lower current level comprising an output circuit including a first resistance circuit and a D.-C. voltage source, a second resistance circuit, a first timing means operative to alternately connect and disconnect said second resistance circuit in parallel arrangement with said first resistance circuit whereby the current flowing in said output circuit fluctuates between a lower current level and an upper current level, and a second timing means operative to isolate said second resistance circuit from said first resistance circuit, the first timing means being subordinate to the second timing means in that isolation of said second resistance circuit by said second timing means precludes connection of said second resistance circuit to said first resistance circuit by said first timing means.

2. A device for producing a series of electrical current pulses alternating between an upper current level and a lower current level comprising an output circuit including a first resistance circuit and a D.-C. voltage source, a second resistance circuit connected in parallel arrangement to said first resistance circuit through two series-connected switches, the first of said switches being responsive to a first timing means, said first timing means being operative to cyclically open and close said first switch, and the second of said switches being normally closed and responsive to a second timing means operative to open said second switch, said second timing means having a time cycle greater than said first timing means whereby the current in said output circuit fluctuates between a lower current level and an upper current level in accordance with the opening and closing of the first of said switches for a period of time determined by the time cycle of said second timing means.

3. An apparatus for producing a series of electrical current pulses alternating between an upper current level and a lower current level comprising an output circuit having two output terminals, a first D.-C. voltage source having two terminals one of which is connected to the first of the two output terminals and the other terminal of said D.-C. voltage source being connected to a first variable resistance circuit which in turn is connected to the second output terminal, a manually operated switch having two contacts, one of the two contacts being connected to one side of a second D.-C. voltage source, a first timing means comprising a second variable resistance circuit having two terminals one of which is connected to one junction of a parallel arrangement of the solenoid of a first relay and a variable capacitor, the other terminal of said second variable resistance circuit being connected to the other contact of said manually operated switch, the other junction of said parallel arrangement being connected to the first of the two contact points of said first relay, the armature of said relay being normally in contact with the said first contact point, the armature of said relay being connected to the junction of the said first variable resistance circuit and the terminal of the said first D.-C. voltage source, a second timing circuit comprising a third variable resistance circuit having two terminals, one of which terminals is connected to the second contact of said manually operated switch and the other of which is connected to one of the junctions of a parallel arrangement of the solenoid of a second relay and a capacitor, the other junction of said parallel arrangement being connected to the armature of said first relay, said second relay having two contact points and an armature, one of the two contact points of the said second relay being connected to a fourth variable resistance circuit which in turn is connected to the said second output terminal, the armature of said second relay being connected to the second contact point of said first relay, whereby connecting a load between said two output terminals and closing said manually operated switch causes a series of electrical current pulses alternating between an upper current level and a lower current level to pass through said load.

4. An apparatus for producing a series of electrical current pulses alternating between an upper current level and a lower current level comprising an output circuit having two output terminals, a first D.-C. voltage source having two terminals one of which is connected to the first of the two output terminals and the other terminal of said D.-C. voltage source being connected to a first variable resistance circuit which in turn is connected to the second output terminal, a manually operated switch having two contacts, one of the two contacts being connected to one side of a second D.-C. voltage source, a first timing means comprising a second variable resistance circuit having two terminals one of which is connected to one junction of a parallel arrangement of the solenoid of a first relay and a variable capacitor, the other terminal of said second variable resistance circuit being connected to the other contact of said manually operated switch, the other junction of said parallel arrangement being connected to the first of the two contact points of said first relay, the armature of said relay being normally in contact with the said first contact point, the armature of said relay being connected to the junction of the said first variable resistance circuit and the terminal of the said first D.-C. voltage source, a second timing circuit comprising a third variable resistance circuit having two terminals, one of which terminals is connected to the second contact of said manually operated switch and the other of which is connected to one of the junctions of a parallel arrangement of the solenoid of a second relay and a capacitor, the other junction of said parallel arrangement being connected to the armature of said first relay, said second relay having two contact points and an armature, one of the two contact points of the said second relay being connected to a fourth variable resistance circuit which in turn is connected to the said second output terminal, the armature of said second relay being connected to the second contact point of said first relay, and a second manually operated switch connected between the armature of said first relay and the first contact point of said second relay.

5. A device for producing a series of electrical current pulses alternating between an upper current level and a lower current level comprising an output circuit including a first resistance circuit and a D.-C. voltage source, a second resistance circuit, and first variable timing means operative to alternately connect and disconnect said second resistance circuit in parallel arrangement with said first resistance circuit whereby the current flowing in said output circuit fluctuates between a lower current level and an upper current level, and a second variable timing means operative to isolate said second resistance circuit from said first resistance circuit, said second timing means having a time cycle greater than said first timing means whereby the current flowing in said output circuit undergoes a plurality of fluctuations before said second resistance circuit is isolated from said first resistance circuit by said second timing means, the first timing means being subordinate to the second timing means in that isolation of said second resistance circuit by said second timing means precludes connection of said second resistance circuit to said first resistance circuit by said first timing means.

6. A device for producing a series of electrical current pulses alternating between an upper current level and a lower current level comprising an output circuit including a first resistance circuit and a D.-C. voltage source, a second resistance circuit, and a first variable timing means operative to alternately connect and disconnect said second resistance circuit in parallel arrangement with said first resistance circuit whereby the current flowing in said output circuit fluctuates between a lower current level and an upper current level, and a second variable timing means operative to isolate said second resistance circuit from said first resistance circuit, said second timing means having a time cycle greater than said first timing means whereby the current flowing in said output circuit undergoes a plurality of fluctuations before said second resistance circuit is isolated from said first resistance circuit by said second timing means, the first timing means being subordinate to the second timing means in that isolation of said second resistance circuit by said second timing means precludes connection of said second resistance circuit to said first resistance circuit by said first timing means, said first timing means being a circuit comprising a D.-C. voltage source and a variable resistor series-connected to a parallel circuit arrangement of a solenoid of a relay and a variable capacitor, and said second timing means being a circuit comprising a D.-C. voltage source and a variable resistor series-connected to a parallel arrangement consisting of the solenoid of a relay and a capacitor.

References Cited in the file of this patent

UNITED STATES PATENTS

| | | |
|---|---|---|
| 2,208,125 | Feingold | July 16, 1940 |
| 2,892,105 | Speer | June 23, 1959 |
| 2,924,333 | Kulick | Feb. 9, 1960 |